April 29, 1952 J. F. SULLIVAN 2,595,019
BAIT FOR RODENT TRAPS
Filed Jan. 14, 1950
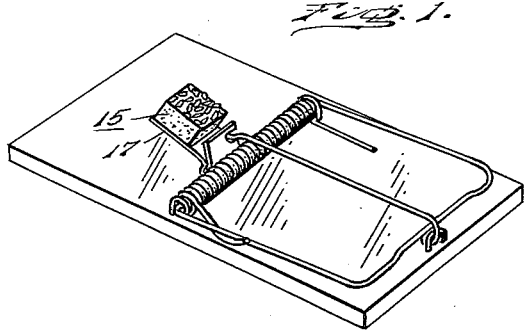
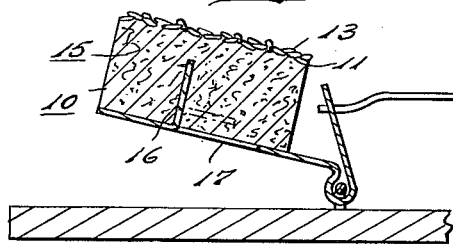
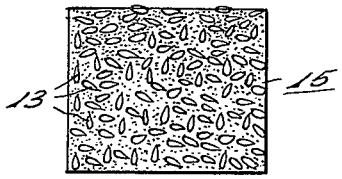
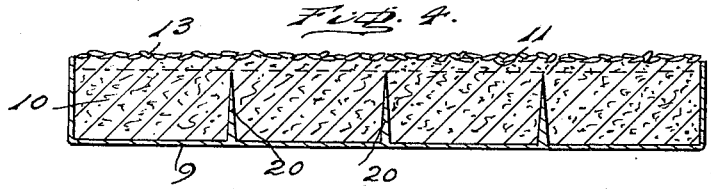
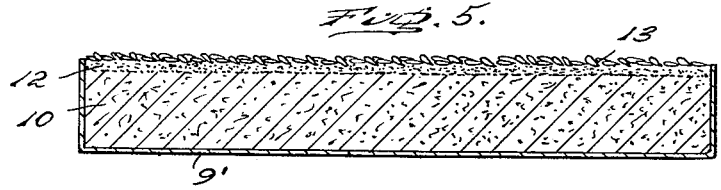
INVENTOR
James F. Sullivan.
BY
Barr, Borden & Fox
ATTORNEYS.

Patented Apr. 29, 1952

2,595,019

UNITED STATES PATENT OFFICE 2,595,019

BAIT FOR RODENT TRAPS

James F. Sullivan, Camden, N. J.

Application June 14, 1950, Serial No. 168,036

2 Claims. (Cl. 99—3)

This invention relates to baits for rodent traps.

Traps are the safest means for exterminating rodents, as poisons are dangerous, are non-discriminatory in their effects, and frequently cause the rodent that happens to absorb the poison to die in inaccessible points within the confines of homes, with untoward olfactory impacts. Most householders with experience prefer traps.

Cheap traps of usable efficiency are widely available, and when the bait pedal or table of one is fairly tripped, the chances are that the rodent will be caught, or at least struck hard enough to cause its death.

As traps are provided, the bait table or pedal or trigger device is conventionally formed as a substantially flat plate of sheet metal from which a small tongue is struck out. The problem is to secure a bait which will be attractive to a rodent and to apply it in such manner to the bait table that any tug thereon from the rodent will grip the trap.

Baits are usually formed of whatever the householder has on hand, such as bread, strips of bacon, or the like. In these and the only known commercial bait, it is necessary to tie the bait pedal by strings or the like, which is a messy and frequently unrewarding activity, as the application is so tenuous that the rodent can eat the bait without disturbing the trigger, or can easily remove portions thereof, or even the whole bait because of the fragility of the bait and the usual insufficiency of the tie to the bait pedal.

It is among the objects of this invention to provide an improved and novel bait for traps for rodents which is both highly attractive to rodents and also so made as to be easily and firmly attachable to a trap without supplemental fastenings; to provide a bait of cheap construction which can be fabricated as small blocks or cakes proper for superpositioning on bait pedals of traps; to provide a bait for rodent traps which is, of itself, non-poisonous and harmless to animals; to provide a bait block having a base providing tight frictional engagement on a tongue on which it is impaled, and upon at least the superficial surface of which grains or seeds are anchored which resist withdrawal by the rodent attracted to same so that the releasing of the trap trigger is substantially certain when a rodent tries to eat such superficially extending seeds or grains; and to provide other objects and advantages as will become more apparent as the description proceeds.

In the accompanying drawings:

Fig. 1 represents a perspective of an illustrative rodent trap with the bait of this invention impaled upon and secured to the bait pedal thereof.

Fig. 2 represents a longitudinal section through the trap of Fig. 1, showing the relation of the block of bait according to my invention to the bait pedal and its integral tongue upon which it is impaled.

Fig. 3 represents a plan of the illustrative bait block of my invention.

Fig. 4 represents a section through an illustrative pan in which the bait base is cast or shaped and showing the superficial layer of hard surfaced seeds partially embedded and anchored thereto, and which base is so formed as to conduce toward easy reduction into smaller sized units.

Fig. 5 represents a section through another form of base-forming pan or receptacle and showing the superficial layer of molten wax applied to the shaped base and upon which the layer of seeds are adherently attached.

In an illustrative embodiment of the invention, I provide a base of wax, in and on the upper superficial surface of which preferably hard surfaced seeds or grains are partially embedded so that although anchored to the base, the outer exposed portions of the seeds or grains are free from wax.

In a typical illustrative example of the wax for the base, I prefer to use beeswax, which has an odor attractive to rodents. As this material is comparatively expensive, I prefer to mix it with a cheaper wax, such as paraffin. Although these waxes have different melting points, i. e. being 145° F. and 127° F. respectively, for the beeswax and paraffin, they form a homogeneous cake when melted together and then poured out and permitted to cool. As an illustrative ratio, I use from 7 to 8 portions of beeswax to from 3 to 2 portions by weight of the paraffin.

This mixture, as noted, is melted and poured into a sheet of approximately $\frac{3}{16}$ of an inch in thickness on any smooth plate or other forming device, such as the surfaces 9 and 9' of Figs. 4 and 5. This forms a base 10. Then, either while still in relatively plastic or fluent condition on the upper surface 11, or after solidifying by the superficial application of a thin molten layer 12, a layer of hard surfaced grains or seeds 13 are deposited on the superficial surface, and by superficially applied pressure thereon are pushed into the semi-plastic viscous upper surface 11.

This may be done, for instance, by a roller (not shown) moving across the upper surface of the layer of grain or seeds. This pushes a portion of the coating layer of grain or seeds into adherent relation to the wax base.

The grains or seeds 13 can be any of those to which rats or mice are attracted, such as any of the cereal grains, such as corn, oats, rye, barley, wheat, or the like, either cracked or including the husks or sheaths. It is preferred, however, to use alpist seeds. These are attractive to both rats and mice and have a fine quality of ready adherence to the wax.

Preferably the basic cake as formed is cut or broken into relatively small rectangles or like units 15 for dispensing to trap purchasers or users. This is facilitated by the divisions 20 in pan 9 of Fig. 4.

In using the bait, the tongue 16 of the bait table or pedal 17 of a trap is bent out of the substantial plane of the bait table, in which it usually lies as such traps are sold. The tongue 16 is bent up until it is substantially perpendicular to the bait table. The small cake 15 is then pushed or impaled firmly on the tongue 16 until the lower surface of the bait cake rests substantially against the bait table 17. It is found that the qualities of the wax base are such that the cake is rigid and self-supporting, so that it neither splits nor crumbles, while establishing such frictional engagement with the tongue as to require appreciable force for removal.

It is recognized that the mode of applying the seends to the wax base may be quite different from the illustrative disclosure, as will the fact that certain seeds may have very slight or no bond with the base. This is not a deterrent, as it encourages a rodent to eat an anchored one to trip the trap, or, by being rubbed off in advance by the finger of the user it scatters a few loose seeds or grains about the trap to lead the rodents thereto.

The bait is capable of numerous successive uses.

The advantages and simplicity of the invention will be clear.

Having thus described my invention, I claim:

1. A bait for a rodent trap comprising a layer of alpist seeds and a wax base having a superficial surface penetrated by portions at least of the seeds of said layer and bonded to the layer by the wax of said base and forming a cake forming a substantially rigid whole for impalement on the tongue of a bait table.

2. A bait for rodent traps comprising a base of wax, a major portion of which is beeswax, a plurality of alpist seeds on said base and in part at least bonded thereto by the wax of said base.

JAMES F. SULLIVAN.

REFERENCES CITED

The following references are of record in the file of this patent:

UNITED STATES PATENTS

| Number | Name | Date |
|---|---|---|
| 973,549 | O'Bryant | Oct. 25, 1910 |
| 1,366,509 | Thiessen | Jan. 25, 1921 |
| 2,152,034 | Fowler | Mar. 28, 1939 |

FOREIGN PATENTS

| Number | Country | Date |
|---|---|---|
| 757,097 | France | 1933 |